Nov. 4, 1924.

J. A. HIRST 1,514,523

ELECTRIC MOTOR STARTER

Filed Aug. 8, 1924    11 Sheets-Sheet 1

Inventor:
J. A. Hirst
by Spear Middleton Donaldson & Hall
Attys

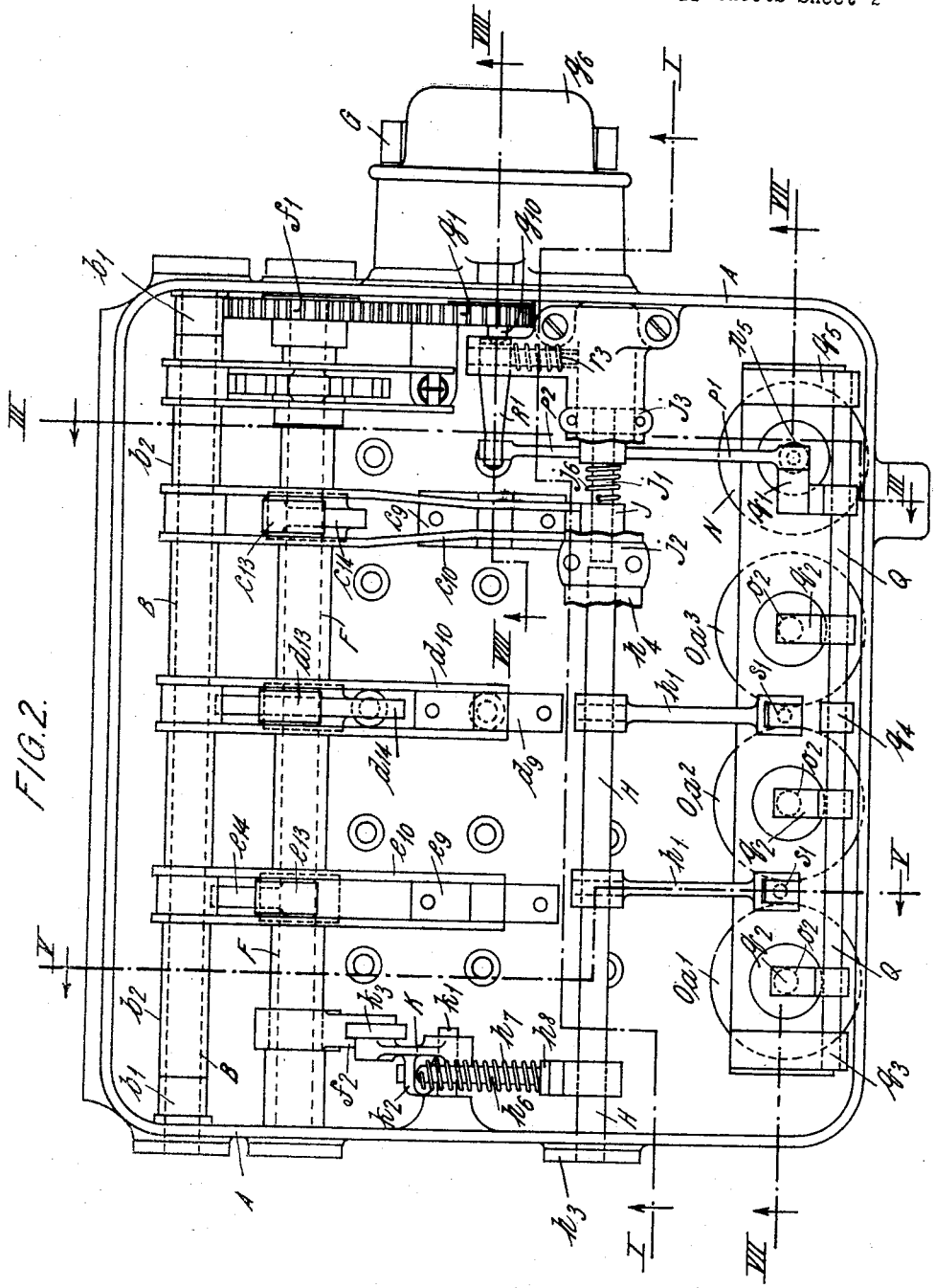

Nov. 4, 1924.
J. A. HIRST
1,514,523
ELECTRIC MOTOR STARTER
Filed Aug. 8, 1924
11 Sheets-Sheet 3
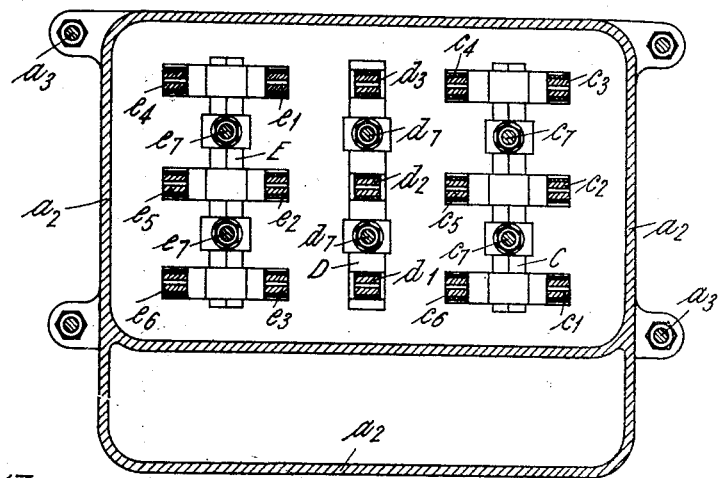
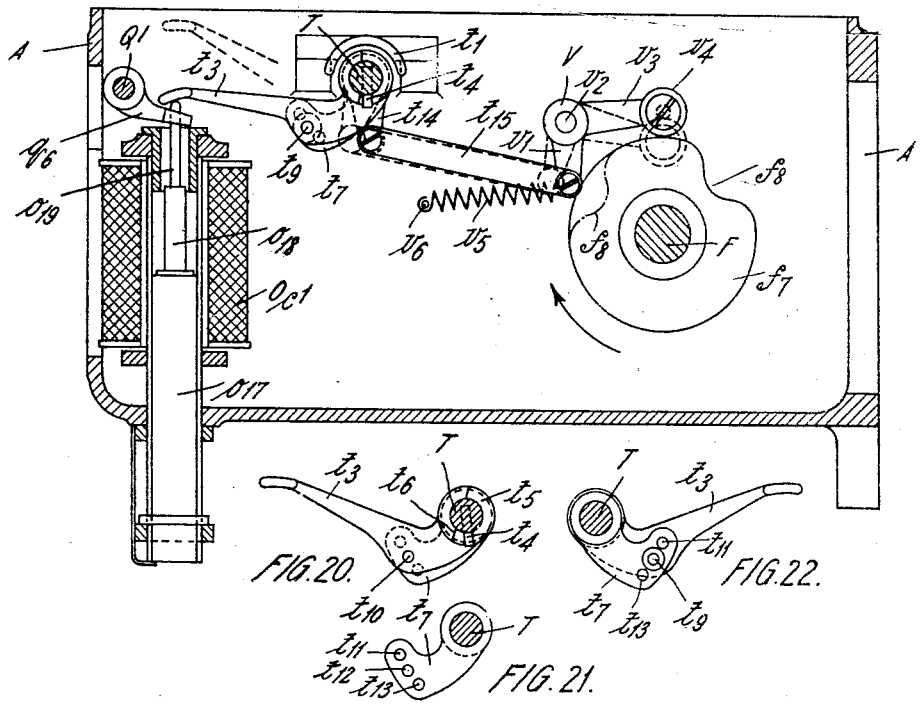
Inventor.
J. A. Hirst
Att'ys.

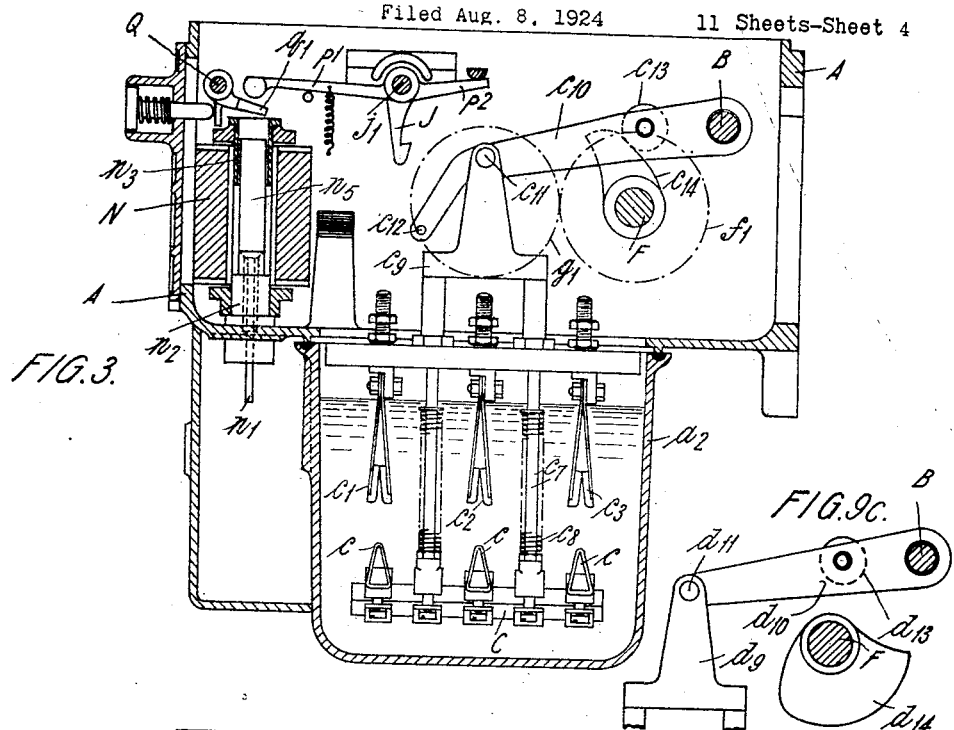
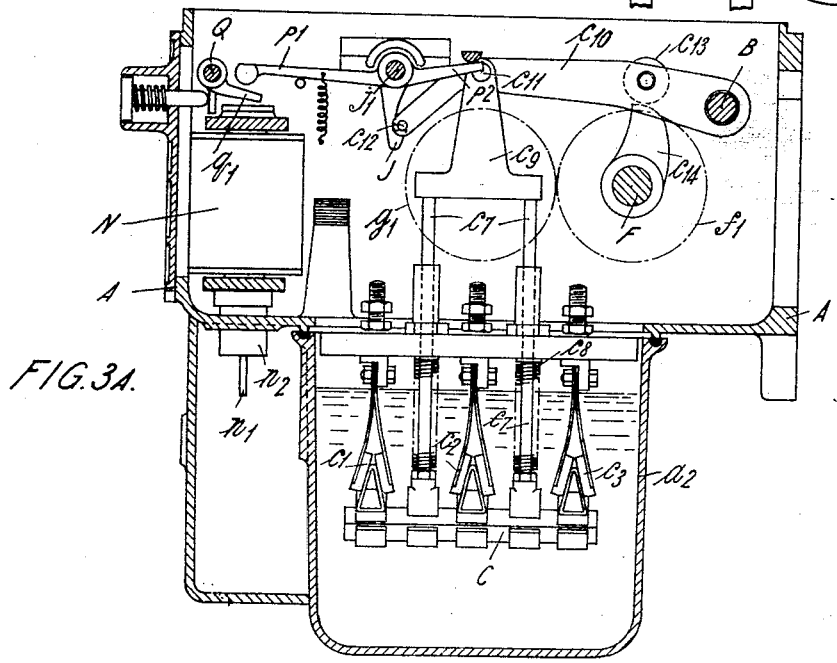

Nov. 4, 1924.　　　　　　　　　　　　　　　　　1,514,523
J. A. HIRST
ELECTRIC MOTOR STARTER
Filed Aug. 8, 1924　　　　11 Sheets-Sheet 5
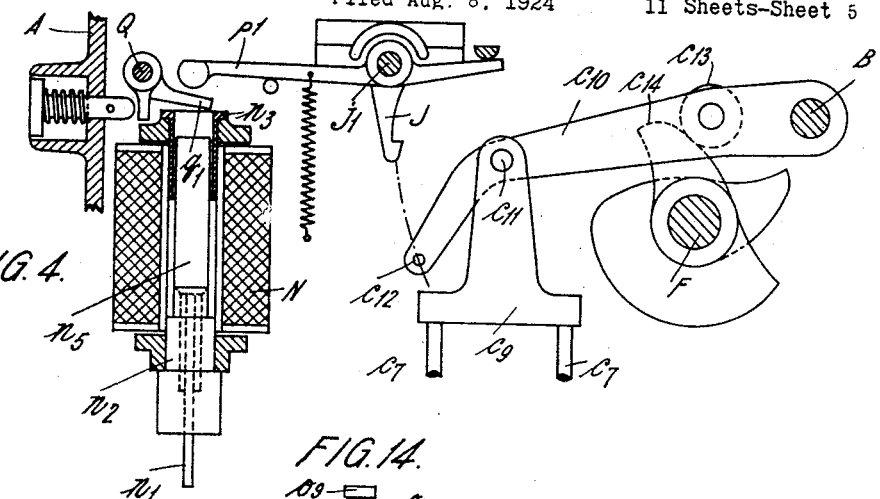
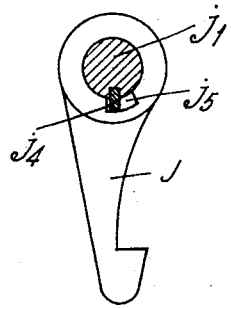
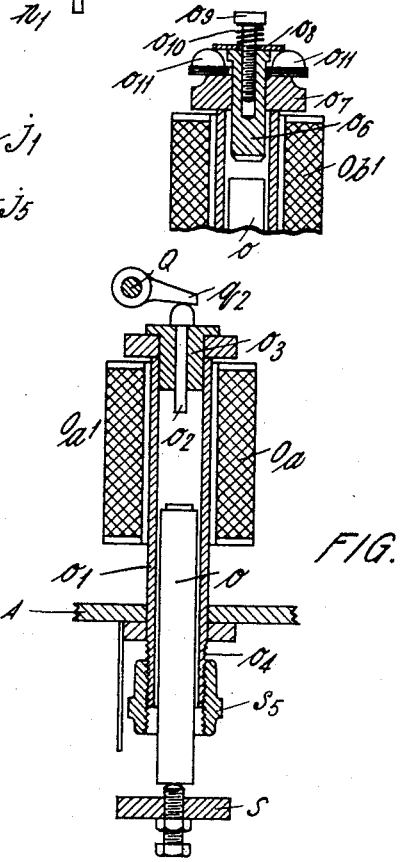
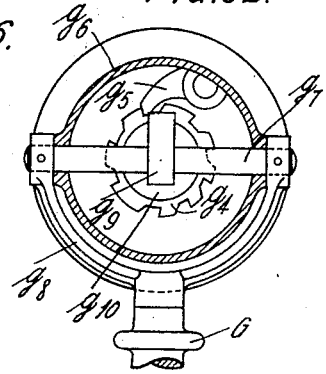
Inventor
J. A. Hirst
by Spear Middleton Donaldson & Hall
Attys.

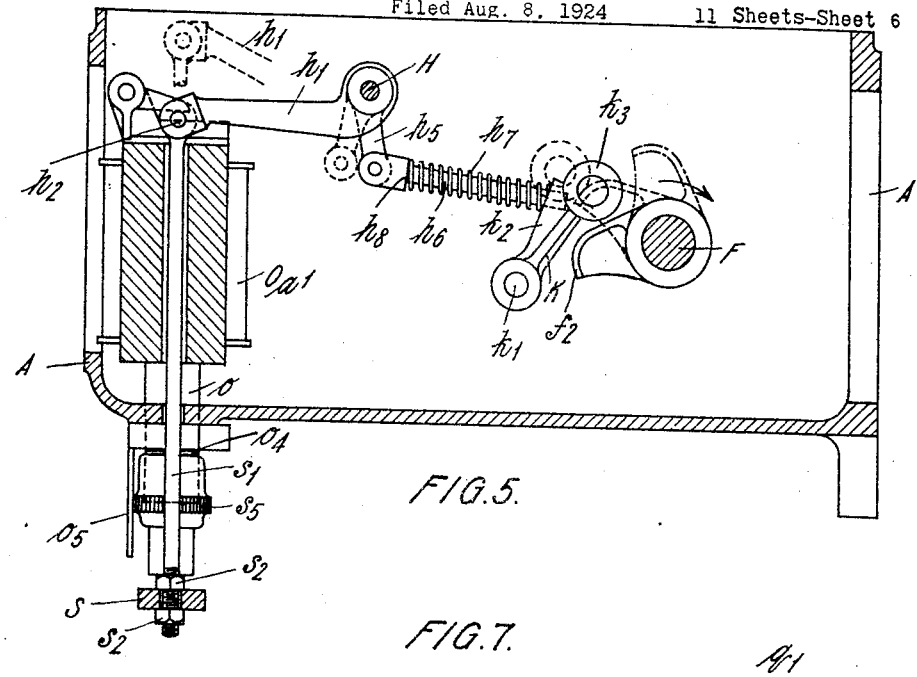

Nov. 4, 1924.

J. A. HIRST 1,514,523

ELECTRIC MOTOR STARTER

Filed Aug. 8, 1924 11 Sheets-Sheet 7

Inventor:
J. A. Hirst.
by Spear Middleton Donaldson & Ball
Attys

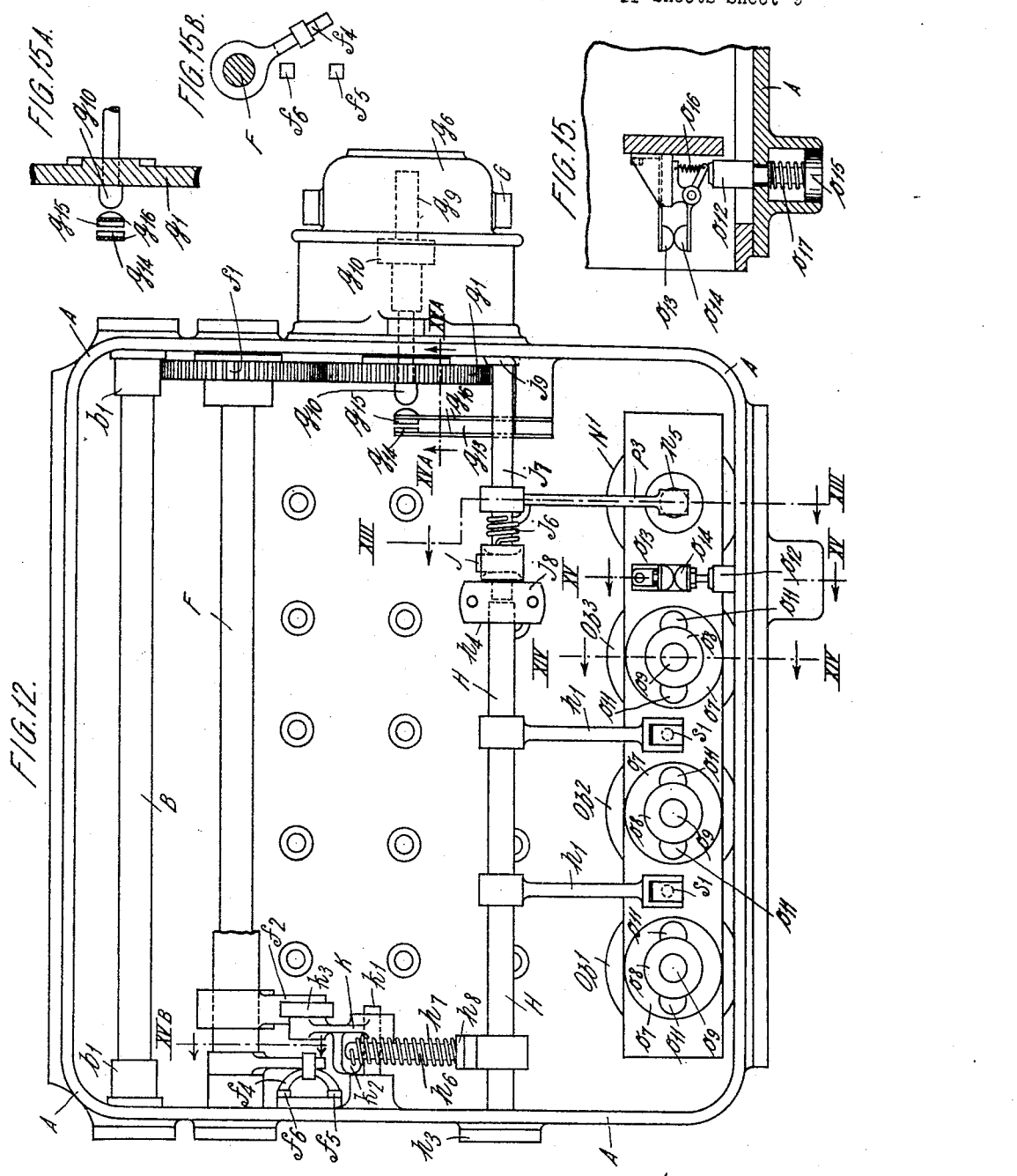

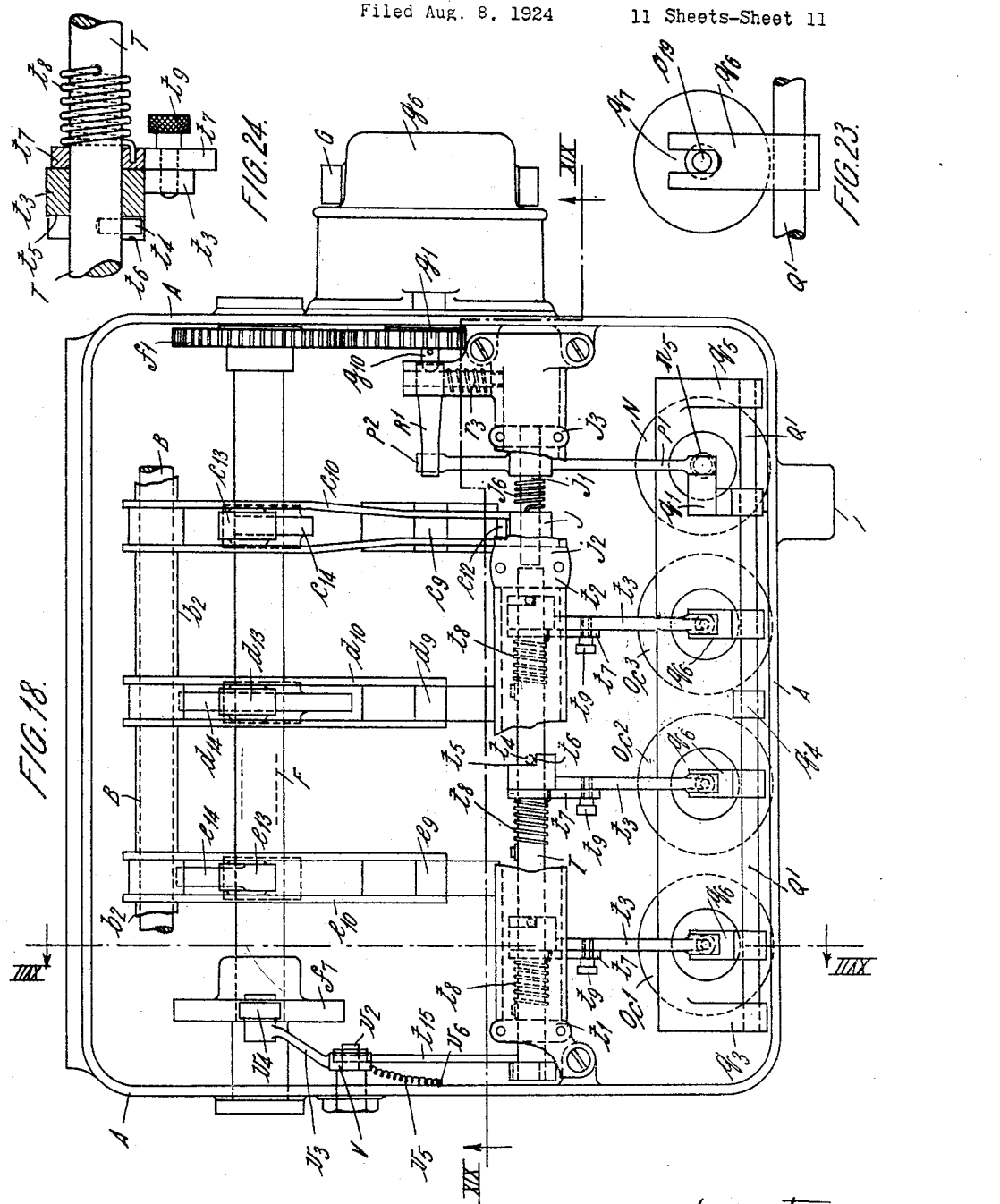

Patented Nov. 4, 1924.

1,514,523

UNITED STATES PATENT OFFICE.

JOHN ARTHUR HIRST, OF CHESTER, ENGLAND.

ELECTRIC-MOTOR STARTER.

Application filed August 8, 1924. Serial No. 730,981.

*To all whom it may concern:*

Be it known that I, JOHN ARTHUR HIRST, a British subject, of Northgate Electrical Works, in the city and county of Chester, England, have invented certain new and useful Improvements Relating to Electric-Motor Starters, of which the following is a specification.

This invention relates to electric motor starting switches and the object is to improve the construction of such switches more particularly in regard to the means whereby the sensitiveness of the devices adapted to open the switch, when an overload occurs whilst the motor is being started, is reduced in such manner as to automatically ensure its restoration before the gear can be left in the full-on running position.

The invention is illustrated in the accompanying drawings, in which—

Figs. 1 to 11 illustrate a modification in which the sensitiveness of the overload device is reduced by moving the armature into a weaker part of the field of its magnet.

Figs. 12 to 16 illustrate a modification of the arrangement of Figs. 1 to 11, and Figs. 17 to 24 illustrate an arrangement in which the sensitiveness of the overload device is reduced by subjecting the armature to a restraining spring pressure.

In the modification illustrated in Figs. 1 to 11;—

Figure 1:
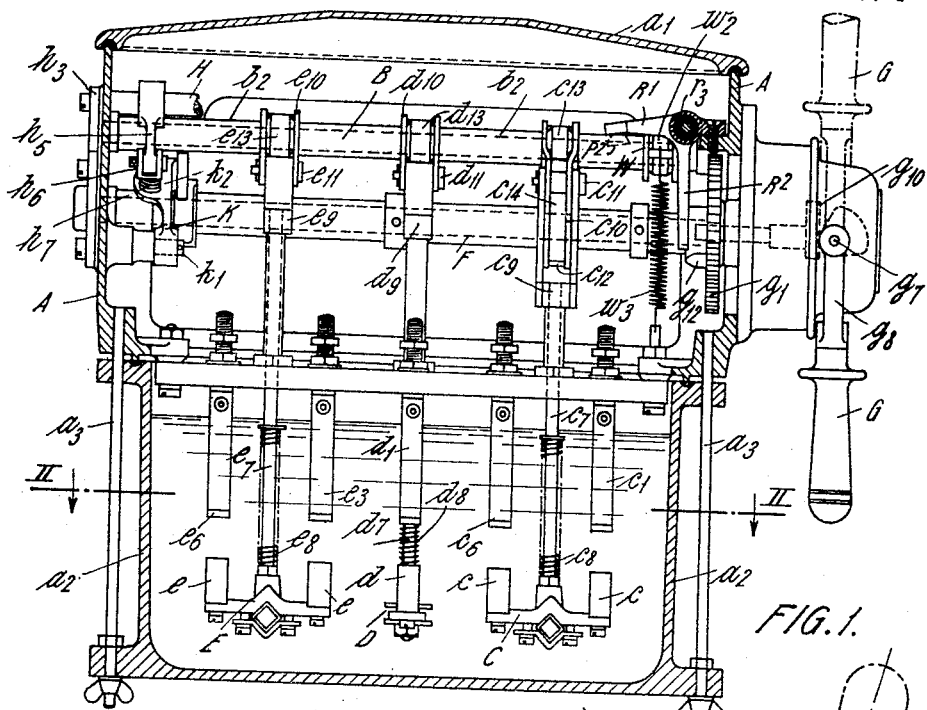

Fig. 1 is an elevation in longitudinal section of the line I, I of Fig. 2.

Fig. 2 is a plan view with the cover removed.

Fig. $2^A$ is a sectional plan on the line II, II of Fig. 1.

Figs. 3 and $3^A$ are part elevations in transverse section on the line III, III of Fig. 2, the parts behind the plane of section being omitted, and the no-volt coil and trip being shown in Fig. $3^A$ in outside view. Fig. 3 shows the switch gear open and Fig. $3^A$ shows it closed.

Fig. 4 is an elevation of the parts shown in Figs. 3 and $3^A$, but to a larger scale and shows the no-volt and trip gear in section.

Figs. $4^A$ and $4^B$ are fragmentary views of parts of Fig. 4 to a larger scale.

Fig. 5 is an elevation in transverse section on the line V, V of Fig. 2.

Fig. 6 is a section through the overload coil on a plane at right angles to the plane of projection of Fig. 7.

Fig. 7 is a side elevation, the overload and no-volt devices being in section on the line VII, VII of Fig. 2.

Figures 8, 8A:
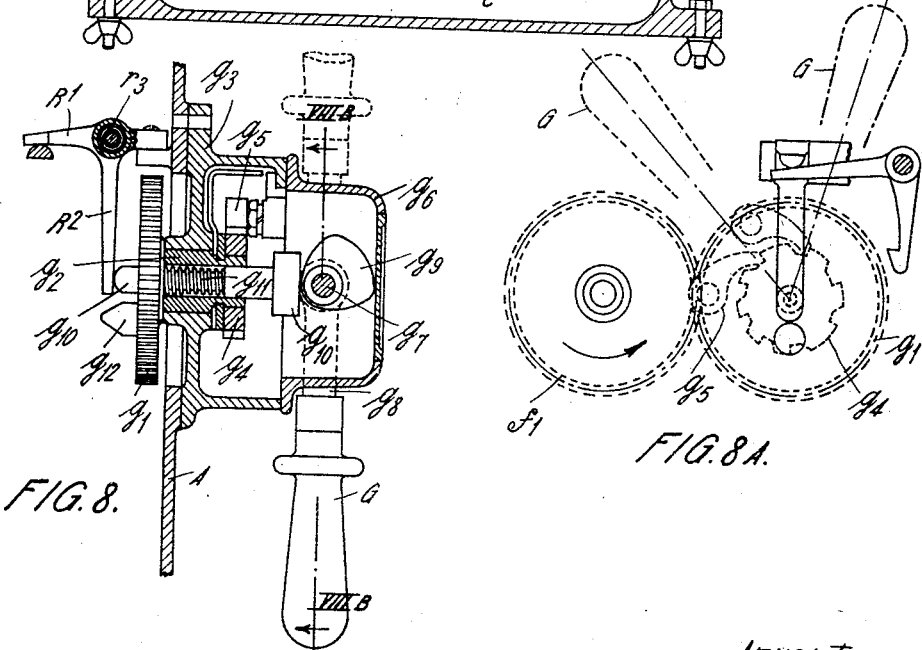

Fig. 8 is a fragmentary section on the line VIII, VIII of Fig. 2 and shows the handle gear.

Fig. $8^A$ is a fragmentary elevation on a plane at right angles to the plane of projection of Fig. 8.

Fig. $8^B$ is a fragmentary section on the line $VIII^B$, $VIII^B$ of Fig. 8.

Figure 9:
Figure 9A:
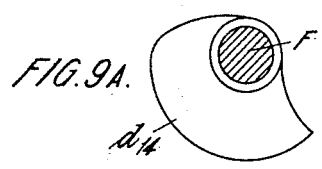
Figure 9B:

Figs. 9, $9^A$, $9^B$ and $9^C$ are fragmentary views showing respectively the cams, and one of the cam levers.

Figure 10:
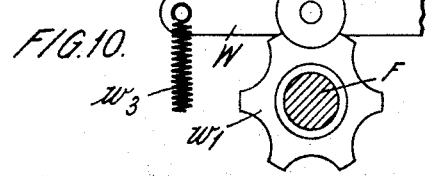

Fig. 10 is a fragmentary view of the locating ratchet and its lever, and

Figure 11:
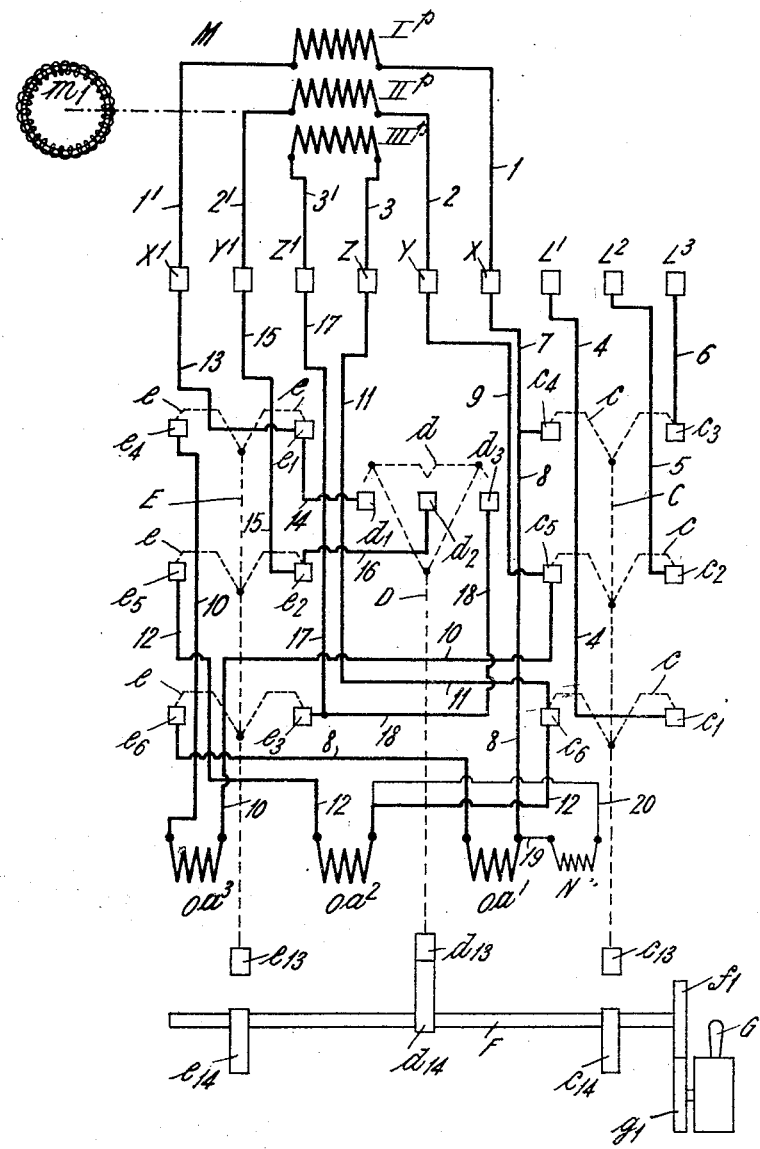

Fig. 11 is a diagram of connections.

In the modification illustrated in Figs. 12 to 16;—

Fig. 12 is a plan view with the switch gear omitted.

Figure 13:
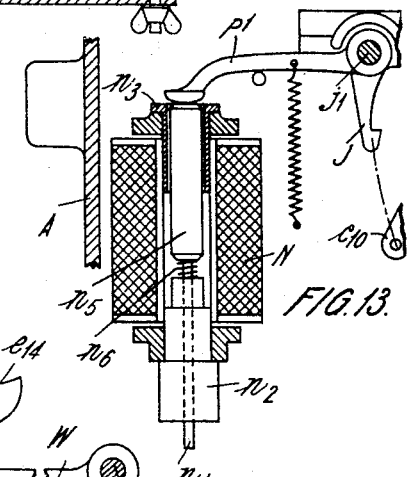

Fig. 13 is a fragmentary section on the line XIII, XIII of Fig. 12 through the no-volt coil.

Fig. 14 is a fragmentary section on the line XIV, XIV through one of the overload coils.

Figure 16:
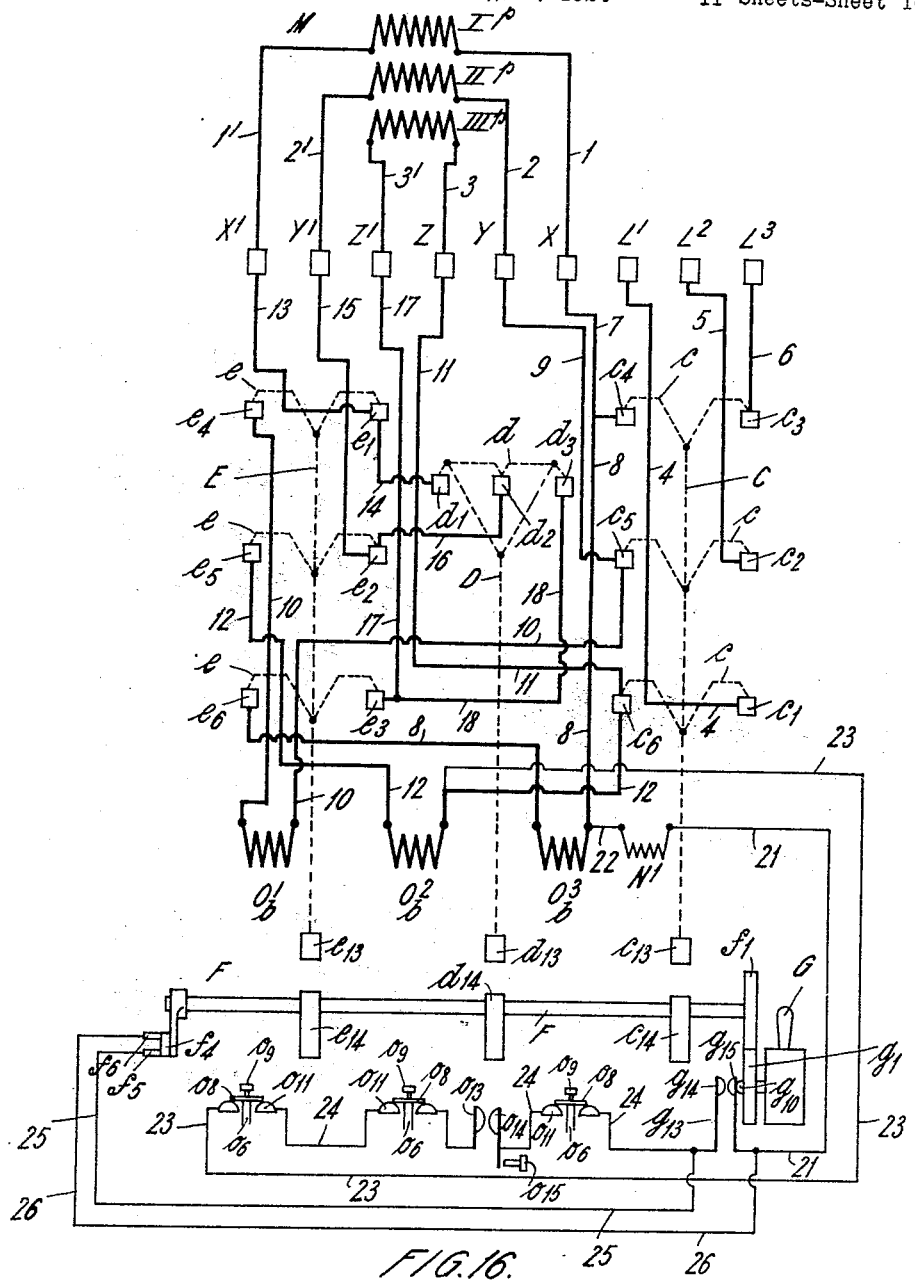

Figs. 15, $15^A$, and $15^B$ are fragmentary sections on the lines XV, XV; $XV^A$, $XV^A$; and $XV^B$, $XV^B$; respectively, and Fig. 16 is a diagram of the connections.

In the modification shown in Figs. 17 to 24;—

Fig. 17 is an elevation in transverse section on the line XVII, XVII, of Fig. 18.

Fig. 18 is a plan.

Figure 19:
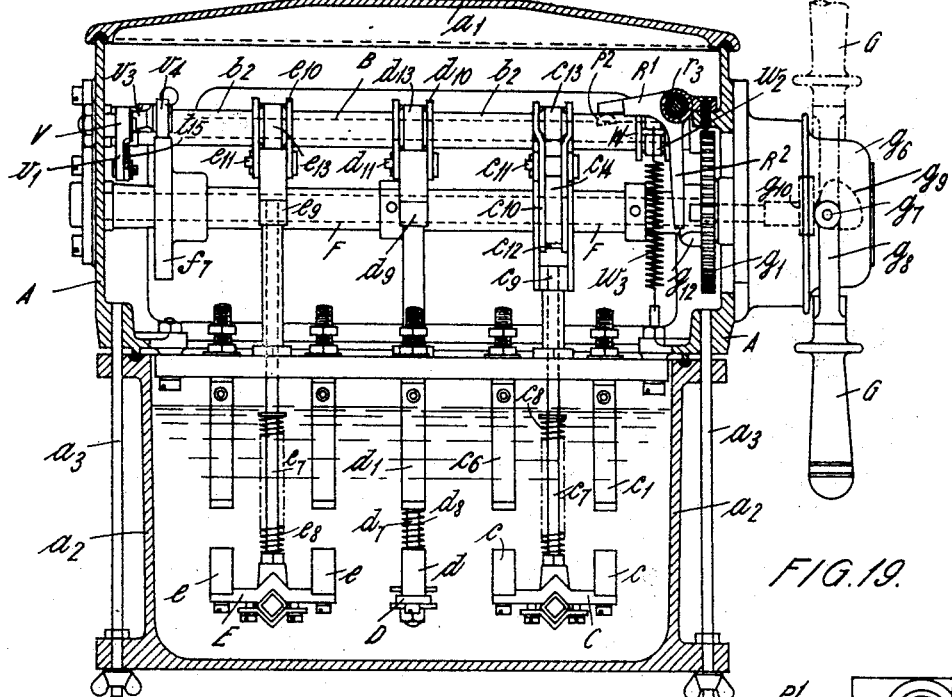

Fig. 19 is an elevation in section on the line XIX, XIX of Fig. 18.

Figs. 20, 21, 22, 23 and 24 are fragmentary views of details.

Referring first to Figs. 1 to 11.

A is the main casing closed by a cover $a^1$, and having detachably fitted thereto an oil-container $a^2$ held in place by the bolts $a^3$.

C is the circuit breaker switch carrying three pairs of blades $c$, the blades of each pair being connected, and the several pairs insulated from each other; when closed this switch connects the three respective contacts $c^1$, $c^2$, and $c^3$, connected to the line wires $L^1$, $L^2$ and $L^3$ (see Fig. 11) to the contacts $c^4$, $c^5$, $c^6$. The switch C is operated by a pair of rods $c^7$ fitted with springs $c^8$ tending to force the switch to its lower open position; the rods $c^7$ are connected to a two-part connection piece $c^9$ which is pivoted to a lever $c^{10}$, having two side-arms, by the pin $c^{11}$. The lever $c^{10}$ is pivoted at one end on a shaft B carried in the bushes $b^1$ and it and the other switch levers are located axially on this shaft by the distance pieces $b^2$; the lever $c^{10}$ is fitted at its outer end with a detent pin $c^{12}$, and carries a roller $c^{13}$ which is actuated by a cam $c^{14}$ keyed to an operating shaft F which is geared by the spur wheels $f^1$ and $g^1$ to the handle mechanism G. As the shaft F is rotated the switch C is lifted by the cam $c^{14}$ to its closed position, in which it is held by the engagement of the pin $c^{12}$ with the holding detent J.

The wheel $g^1$ is fixed to a sleeve $g^2$ mounted in the fixed part $g^3$ of the two part casing of the mechanism operated by the handle G (see Figs. 8 and $8^A$) to which sleeve is fixed a ratchet $g^4$ actuated by a pawl $g^5$ carried by the angularly reciprocating part $g^6$ of the handle casing to which latter the handle G is pivotally attached by the bow shaped lever $g^8$ fixed to a pin $g^7$ pivotally mounted across the casing part $g^6$. When the handle is used to reciprocate the casing part $g^6$ a step-by-step angular movement is imparted to the shaft F.

D is a switch having three contacts $d$, adapted when the switch is closed to connect together the three contacts $d^1$, $d^2$ and $d^3$, and so to make the star connections. E is a three pair contact switch the contacts $e$ of which are adapted to connect the three contacts $e^1$, $e^2$ and $e^3$ respectively, to the contacts $e^4$, $e^5$ and $e^6$ and so make the delta connections.

The switches D and E are connected by respective rods $d^7$ and $e^7$ (fitted with springs $d^3$ and $e^8$) to connection pieces $d^9$ and $e^9$, which in turn are connected to levers $d^{10}$ and $e^{10}$ by pins $d^{11}$ and $e^{11}$, and the cam levers $d^{10}$ and $e^{10}$ are pivoted on the shaft B and fitted with respective cam rollers $d^{13}$ and $e^{13}$ which are operated by respective cams $d^{14}$ and $e^{14}$ on the cam shaft F. These several parts are constructed and connected as described in connection with the circuit breaker switch C, except that the levers $d^{10}$ and $e^{10}$ have no detent pin and holding detent such as $c^{12}$ and J as provided for the lever $c^{10}$; the levers $d^{10}$ and $e^{10}$ are respectively held in the positions in which they close the switches D and E, by means of the cams $d^{14}$ and $e^{14}$, which are so shaped (see Figs. 9, $9^A$ and $9^B$) that they close the switches at the appropriate period in the rotation of the shaft F and retain them closed for the respective times required.

The detent J is mounted on a shaft $j^1$ carried in bearings $j^2$ $j^3$; the shaft has a feather $j^4$ fixed to it and the detent has a slot $j^5$ which permits a slight relative movement between the detent and the shaft; a spring $j^6$ is interposed between the detent and the shaft which maintains the detent in the position shown in Fig. $4^A$; when the circuit breaker is closed and the pin $c^{12}$ engages with the detent J the spring $j^6$ permits the detent to yield as the pin passes its hooked end.

On the shaft $j^1$ is keyed a trigger lever $P^1$, $P^2$, the end of the arm $P^1$ lies over a trip lever $q^1$ mounted on a shaft Q carried in bearings $q^3$, $q^4$ and $q^5$. The trip lever $q^1$ lies over the armature $n^5$ of a no-volt coil N the winding of which is connected across the supply mains. The armature has a tail piece $n^1$ guided in the cap $n^2$, and the upper end of the armature is guided in a sleeve $n^3$; the cap $n^2$ is recessed as at $n^4$, and a spring $n^6$ is interposed between the shoulder $n^1$ and the bottom of the recess in $n^2$. When the winding N is energized the armature is held in the position shown in Figs. 3, 4 and 7; when the winding is de-energized the spring $n^6$ raises the armature which then engages with the trip lever $q^1$ (see Fig. 7) and the latter by raising the arm $P^1$ releases the detent J and permits the circuit breaker C to open.

Three overload magnets $O^{a1}$, $O^{a2}$, $O^{a3}$, are fitted having armatures $o$ sliding in tubes $o^1$, and adapted when actuated by an overload current in the winding $O^a$ to rise and strike the trip piece $o^2$ guided in the cap $o^3$. Over each trip piece $o^2$, a trip lever $q^2$ is fitted, each trip lever being keyed to the shaft Q. When any one of the overload armatures $o$ is actuated, the trip piece $o^2$ strikes its trip lever $q^2$ and imparts angular movement to the shaft Q and causes the trip lever $q^1$ to trip the detent J as described and permit the circuit breaker C to open.

The sensitiveness reducing device comprises;—a movable platform S which is arranged to support the three armatures or plungers $o$ of the three overload coils; the platform is carried by two rods $s^1$, the lower ends of which pass through the platform which by means of the nuts $s^2$ is adjustable axially relatively to the rods; the upper ends of the respective rods $s^1$ are pivotally attached to the free ends of levers $h^1$ keyed to a shaft H carried in bearings $h^3$ and $h^4$ from the casing A, the heads of the rods fitting between jaws formed at the free ends of the levers, and the joint being made by a pin $h^2$; to the shaft H a lever $h^5$ is keyed which lever is in turn connected by the rod $h^6$ and spring $h^7$ mounted on the said rod to a lever K mounted on a fixed pivot $k^1$ carried from the frame A; the rod $h^6$ passes freely through a hole in the lug $k^2$ formed on the lever K and the spring $h^7$ is interposed between the lug $k^2$ and a facing $h^8$ on the rod $h^6$; the lever K carries a cam roller $k^3$ which is actuated by a cam $f^2$ mounted on the cam shaft F.

In all positions of the gear, except the actual running position, the platform S and the gear just described occupies the position shown in full lines in the drawing, in which position the overload plungers $o$ are located in a comparatively weak part of the magnetic field of the overload coils.

This position is so arranged that, whilst such overloads as are experienced in starting a motor do not energize the overload coils to an extent sufficient to actuate the plungers $o$, these plungers are actuated when overloads are experienced which, like short circuits, are likely to damage the motor if carried even for comparatively short periods.

When the switch gear is moved into its running position the cam $f^2$ engages with the roller $k^3$ and by operating the lever K the spring rod $h^6$, the lever $h^5$, the levers $h^1$ and the rods $s^1$ raises the platform into the position shown in dotted lines thus bringing all overload plungers $o$ into a stronger part of the field due to the overload coils, so that the plungers are actuated when overloads are experienced such as would be unsafe under running as distinguished from starting conditions.

The extent of downward movement of the platform S is determined by adjustable limits which may conveniently consist of fixed rods $s^3$, the ends of which are screwed and provided with lock-nuts $s^4$; and the limit of upward movement of the platform is determined by a calibrating sleeve-nut $s^5$ screwing on to the finely screw-threaded portion $o^4$ which may conveniently be the extension of the tubular interior of the centre overload coil. $o^5$ is a graduated scale by which the sleeve nut $s^5$ is set, and the platform by engagement of the sleeve nut has its upward movement limited.

The cam $f^2$, being mounted on the shaft F, has imparted to it a step-by-step angular motion in the direction of the arrow Fig. 5; in the "off" position of the gear the cam occupies the position shown in chain-dotted lines Fig. 5; between that position and the one shown in full lines, the step-by-step movement will have closed the circuit breaker, closed the star connection switch, and, after an interval, opened this switch and simultaneously closed the delta connection switch, thus giving the running connections corresponding with the position of the cam $f^2$ in full lines; in this position the motor connections have been made but the sensitiveness of the overload coils is still reduced; the next movement of the operating handle, however, moves the cam $f^2$, lever K, spring rod $h^6$, lever $h^5$ and levers $h^1$ and platform S into the position shown in dotted lines, in which the sensitiveness of the overload device has been restored to that necessary for running conditions.

As the running connections are made before the sensitiveness reducing device is rendered inoperative, it is necessary to provide against the gear being left in this position; accordingly, a spring controlled bell crank trigger lever $R^1$, $R^2$ (see Fig. 8) the spring $r^3$ of which is arranged to cause the arm $P^2$ of the lever $P^1$, $P^2$ (see Fig. 4) to press on and release the detent J; the lever $R^1$, $R^2$ is prevented from doing this when the handle G is in the operative position (shown in dotted lines Fig. 8) in which case the cam $g^9$ keyed to the handle spindle $g^7$ moves an engaging piece $g^{10}$, against the influence of a spring $g^{11}$, into engagement with the lever $R^2$, which engagement piece then renders the lever $R^1$, $R^2$ inoperative to release the detent J. When the gear has been operated so that the cam roller $k^3$ has been moved by the cam $f^2$ into the position shown in dotted lines Fig. 5, and not until then, an engaging piece $g^{12}$, carried by the gear wheel $g^1$, engages the arm $R^2$ of the lever $R^1$, $R^2$ so that when the handle G is afterwards released and the engaging piece $g^{10}$ retracted, the engaging piece $g^{12}$ renders the lever $R^1$, $R^2$ inoperative. The engaging piece $g^{12}$ does not, of course, prevent the release of the detent J should the lever $P^1$ (see Fig. 4) be actuated in the manner described by the overload control or the no-volt control. In this way the sensitiveness reducing device is operative from the "off" position of the gear through the several starting operations to the position in which the running connections are effected, and is maintained operative for a further step of the gear beyond this position, but the gear is so arranged that until this further step is made and the sensitiveness reducing device rendered inoperative, the release of the handle operating the gear will result in the circuit breaker being opened, and, as the gear actuating means can be rotated in the one direction only, this will necessitate a return of the gear to the "off" position and entail the motor being started up again in the ordinary way.

The set screws $s^4$ fitted to the platform S are for calibrating purposes, and they are set so as to ensure the plungers $o$ being actuated simultaneously for an equal overload in the three phases.

The connections of the circuit breaker C and the switches D and E to the electric supply mains, the stator windings of the motor, the overload and no-volt coils will be understood from the diagram Fig. 11.

$L^1$, $L^2$ and $L^3$ are the three-phase supply mains; I$^p$, II$^p$ and III$^p$ are the three phases of the stator windings of a motor M having a squirrel cage rotor $m^1$; the terminals X, Y and Z are respectively connected by the conductors 1, 2, 3 to one set of ends of the stator windings, and the terminals X$^1$, Y$^1$ and Z$^1$ are connected by the conductors 1', 2', 3' to the other respective ends.

The contacts $c^1$, $c^2$ and $c^3$ are connected by the conductors 4, 5, 6 to the supply main L$^1$, L$^2$, L$^3$.

The contact $c^4$ is connected by the conductor 7 to the terminal X, and by the conductor 8, through the overload coil O$^{a1}$, to the contact $e^6$; the contact C$^5$ is connected by the conductor 9 to the terminal Y, and by the conductor 10, through the overload coil O$^{a3}$, to the contact $e^4$; and the contact $c^6$ is connected by the conductor 11 to the terminal Z and by the conductor 12, through the overload coil O$^{a2}$, to the contact $e^5$.

The contact $e^1$ is connected by the conductors 13 and 14 respectively to the terminal X$^1$ and the contact $d^1$; the contact $e^2$ is connected by the conductors 15 and 16 respectively to the terminal Y$^1$ and the contact $d^2$; and the contact $e^3$ is connected by the conductors 17 and 18 to the terminal Z$^1$ and the contact $d^3$.

The no-volt coil is connected by the conductors 19 and 20, and the conductors 8 and 12 to the contacts $c^4$ and $c^6$ and therefore across one of the phases.

The circuit breaker C is first closed; then the switch D is closed this gives the star connection; then the switch D is opened and the switch E is closed, this gives the delta or running position.

Referring now to Figs. 12 to 16;—

In the modification illustrated in these figures, the arrangement of the circuit breaker and switches and the means by which the switch gear is operated, are as described in connection with Figs. 1 to 11, and for the sake of clearness of illustration the parts which are constructed in the manner already described are omitted.

In the present modification the mechanical release of the detent lever J is effected by the action of the no-volt coil only; the over-load coils when actuated cause the release indirectly by opening the circuit of the no-volt coil. The shaft Q and the trip levers $q^1$ and $q^2$ are therefore omitted; and instead of mechanical means such as the bell-crank lever R$^1$, R$^2$ being employed to effect the release of the circuit breaker and permit it to open should the operating handle be released before the cam shaft F has moved the sensitiveness reducing device into its inoperative position so as to restore sensitiveness, electric switches in the circuit of the no-volt coil are employed for this purpose, one switch being controlled by the operating shaft F which actuates the cam $f^2$ and the other being controlled by the axially moving part $g^{10}$ of the handle gear.

Referring now to Figs. 12 to 16;—O$^{b1}$, O$^{b2}$, and O$^{b3}$ are overload coils, the windings of which are connected in the main circuit (see Fig. 16). The overload coils, in respect to the mode in which the armatures $o$ are moved by the platform S so as to alter the sensibility of the device are as described in Fig. 6 in relation to the modification illustrated in Figs. 1 to 11. Trip pieces $o^6$ are fitted to the respective overload devices which slide in the fixed parts $o^7$; each carries a circular disc $o^8$ mounted on a screw $o^9$ screwing into the trip piece $o^6$, a spring $o^{10}$ being interposed between the head of the screw $o^9$ and the disc $o^8$. In its normal position, that shown in Fig. 14, the disc $o^8$ rests on two insulated hemispherical contacts $o^{11}$, and serves to connect these two contacts together, and the contacts $o^{11}$ are connected in the circuit of the winding of the no-volt coil N$^1$ (see Figs. 12 and 16). When, therefore, any one of the overload coils is operated, due to an overload, its armature $o$ is raised and strikes the trip piece $o^6$ raising the disc $o^8$ and breaking the circuit between the contacts $o^{11}$, and opening the winding of the overload coil N$^1$.

The construction of the overload coil N$^1$ is similar to the overload coil N, as described in connection with Figs. 1 to 11. The armature $n^5$ when operated by the spring $n^6$, upon the de-energizing of the coil, strikes a lever P$^3$ mounted on a detent shaft $j^7$ mounted in bearings $j^8$ and $j^9$ carried from the main casing A. The detent lever J and the lever P$^3$ are connected to the detent shaft $j^7$ as described in connection with Fig. 4$^A$, the spring $j^6$ permitting limited angular movement between the detent lever J and the shaft $j^7$ as described. It will be seen therefore that when the lever P$^3$ is actuated by the de-energizing of the coil N$^1$ that the detent lever J releases the detent pin $c^{12}$ of the circuit breaker, whereupon the latter opens.

A switch $g^{13}$ comprising two contacts $g^{14}$ and $g^{15}$ carried by spring arms $g^{16}$ is arranged so that the arms normally maintain the contacts apart, and so that the axially moving part $g^{10}$ is adapted, when the handle G is in its operative position, to close the switch $g^{13}$; the contact $g^{15}$ of this switch is connected by the conductor 21 to one end of the no-volt coil N$^1$, the other end of this coil being connected by the conductors 22 to one of the supply phases, one of the other phases being connected, by the conductors 23 and 24, in series with the three pairs of contacts $o^{11}$, and the contacts $o^{13}$ and $o^{14}$ of the push-button switch $o^{12}$, to the contact $g^{14}$ of the switch $g^{13}$. A switch $f^4$ is mounted on a cam shaft F and is adapted to close two contacts $f^5$ and $f^6$, which contacts are connected by the conductors 25 and 26 to the contacts $g^{14}$ and $g^{15}$; when the switch $f^4$ connects the contacts $f^5$ and $f^6$ the switch $g^{13}$ is short-circuited.

The part $g^{10}$ is operated by the secondary movement of the handle as described in connection with Figs. 1 to 11.

The no-volt coil is therefore de-energized when any one of the overload coils is operated, or when the switch $g^{13}$ is opened (unless this switch is short-circuited by the switch $f^4$), or when press-button $o^{15}$ is actuated to separate the contacts $o^{13}$ and $o^{14}$ which are normally held closed by a spring $o^{16}$, the press-button being held in its "off" position by the spring $o^{17}$.

The switch $f^4$ is fixed on the cam shaft F in such angular position, in relation to the cam $f^2$ (see Fig. 5) that it does not close the contacts $f^5$ and $f^6$ until after the cam $f^2$ has been moved into the position in which it has rendered the sensitiveness reducing device inoperative, and thereby restored the sensitiveness of the overload coils. If, therefore, the handle G be released before the sensitiveness reducing device has been rendered inoperative, such movement by retracting the axially moving piece $g^{10}$ will allow the switch $g^{13}$ to open, and this, as described, will open the circuit of the no-volt coil $N^1$ and result in the release of the circuit breaker detent, and the opening of the circuit breaker. If, however, the shaft F has, by the operation of the handle, been moved into the angular position in which the cam $f^2$ has operated the lever K and so restored sensitiveness, the switch $f^4$ will have been moved into the angular position in which the cam $f^2$ has operated the lever K and so restored sensitiveness, the switch $f^4$ will have been moved into the position in which it short-circuits the contacts $g^{14}$ and $g^{15}$ of the switch $g^{13}$; the handle G can be, therefore, released without breaking the circuit of the no-volt coil.

As described the sensitiveness of the overload coils is not restored until after the cam shaft has opened the switch D and closed the switch E so effecting the running connections of the motor. The said connections are made when the cam $f^2$ is at or near the position indicated by the full lines in Fig. 5; it is therefore necessary to move the shaft F by actuation of the handle G through a further angle before the sensitiveness reducing device is rendered inoperative; there is therefore a time interval between the making of the running connections of the motor and the restoration of the sensitiveness of the overload devices during which the motor accelerates to its full speed, and if the handle G be released before the shaft is moved through the further angle the circuit breaker will be opened, as described, by the opening of the switch $g^{13}$, since the switch $f^4$ will not have been moved into the position in which it short-circuits the switch $g^{13}$.

The arrangement in the modification last described thus ensures, as in the modification first described, that the attendant shall by the operation of the handle G first close the circuit breaker, then by operating the switches D and E make running connection, and then, after an interval, restore the sensitiveness of the overload coils, before he can release the handle without such release being attended by the opening of the circuit breaker.

The electrical connections of the several parts of the modification last described are shown in Fig. 16; with the exception of the connections of the circuit of the winding of the magnet of the no-volt coil they are similar to those shown in Fig. 11 and described in connection with Figs. 1 to 11.

In the modifications already described the sensitiveness of the overload devices is reduced by lowering the armatures of the said devices into a weaker part of the magnetic field; the same result may, however, be accomplished by subjecting the armatures when it is desired to reduce the sensitiveness, to a restraining spring pressure which opposes the magnetic pull, and means for accomplishing this are shown in the modification illustrated in Figs. 17 to 23.

In these figures the arrangement of the circuit breaker, the switches D and E, the handle mechanism, the no-volt coil N, the levers $P^1$, $P^2$, the releasing levers $R^1$, $R^2$, and the detent lever J are as already described in connection with Figs. 1 to 11.

The arrangement of the sensitiveness reducing device is as follows:

The overload coils $O^{c1}$, $O^{c2}$, $O^{c3}$ have armatures $o^{17}$, the intermediate portions $o^{18}$ of which are reduced in diameter, and have an extension in the form of a tail $o^{19}$ of still smaller diameter; the respective tails pass freely through slots $q^7$ in trip levers $q^6$ mounted on a trip lever shaft $Q^1$, so that when an overload device is operated on an overload, the shoulder of the part $o^{18}$ of its armature engages with the trip lever $q^6$ and oscillates the shaft $Q^1$, this operates the trip lever $q^1$ which is keyed on the shaft $Q^1$ and this effects the release of the detent J in the manner described in connection with Figs. 1 to 11.

A shaft T is carried in bearings $t^1$ and $t^2$, and on it are mounted a series of three levers $t^3$, each capable of limited angular movement relative to the shaft, the amount of such movement being determined by pins $t^4$ fixed in the shaft T, which pins engage with the ends of the slotted parts $t^5$ of the bosses of the levers $t^3$. Each lever $t^3$ is provided with a lever $t^7$; each lever $t^7$ being mounted on the shaft T and being connected to the said shaft by a spring $t^8$; one end of the spring engaging the lever and the other end of the spring being fixed to the shaft; the respective levers $t^7$ are connected to the respective levers $t^3$ by means of a pin $t^9$ passing through a hole $t^{10}$ in the lever $t^3$, and being adapted to fit any one of the holes $t^{11}$, $t^{12}$, $t^{13}$ in the lever $t^7$. The respective springs $t^8$ therefore exert an elastic pressure on the levers $t^3$ and tend normally to press the abutment $t^6$ into contact with the pin $t^4$. The shaft T has keyed to it a lever $t^{14}$ which is connected by a rod $t^{15}$ to an arm $v^1$ of a bell-crank lever V mounted on a fixed pivot $v^2$ carried from the casing A; the other arm $v^3$ of the bell-crank lever V is provided with a cam roller $v^4$, operated by a cam $f^7$ keyed on the shaft F; the roller $v^4$ being maintained in contact with the cam by a spring $v^5$ connecting the end of the lever $v^1$ to the fixed pin $v^6$. When the cam is in the position shown in Fig. 17 the shaft T is turned into the angular position in which the ends of the levers $t^3$ press on the tails $o^{19}$ of the respective overload devices with a spring pressure which can be regulated by inserting the pin $t^9$ in the appropriate one of the holes $t^{11}$, $t^{12}$ or $t^{13}$. The spring pressure thus exerted on the tails $o^{19}$ reduces the sensitiveness of the overload devices, the current required to operate the armature subjected to the spring pressure, being, of course, greater than that required to operate the free armature in the same position.

As the switch gear is operated the cam shaft is turned in the direction of the arrow, from the position shown in Fig. 17, and the circuit breaker is first closed; after a further angular movement the switch D is closed; after further movement the switch D is opened and the switch E is closed, this gives the running connections for the motor; in this position the depression or recess $f^8$ in the cam occupies the position shown in chain-dotted lines in Fig. 17; after further angular movement the recess $f^8$ comes below the roller $v^4$, the latter is then moved by the spring $v^5$ into the depression $f^8$, whereupon the shaft T is rotated and the levers $t^3$ move by the pins $t^4$ into the position shown in dotted lines clear of the tail-pieces $o^{19}$, the normal sensitiveness of the overload device being thus restored.

It will be seen that there is an interval, during which the shaft F has to be further rotated, between the time of making the running connections, and the time at which the sensitiveness reducing devices are rendered inoperative to restore normal sensitiveness to the overload devices.

The engaging pin $g^{12}$ on the gear-wheel $g^1$ (which as in the modification first described is geared to the cam shaft F by the gear-wheel $f^{1}$) is so located on the gear-wheel $g^1$ that it is not brought into the position in which it renders the trip lever $R^1$, $R^2$ inoperative until the cam shaft has been moved into that position in which the depression $f^8$ is brought below the cam roller $v^4$; consequently as in the arrangements described if the handle G be released before the sensitiveness reducing device is rendered inoperative the trip lever $R^1$, $R^2$ trips the detent J and permits the circuit breaker to open, in which case it is necessary before the motor can be again started that the gear should be returned to its "off" position and the starting operations repeated.

Having now fully described my invention, I declare that what I claim, and desire to secure by Letters Patent, is:—

1. In an electric motor starter in combination;—a motor, a circuit breaker; an overload device adapted when operated by excess current to effect the opening of the circuit breaker; connection changing switches; a shaft adapted when rotary movement is imparted to it to close the circuit breaker and to operate the connection changing switches in succession; means which when in operative position reduce the sensitiveness of the overload device; and means carried by the operating shaft, adapted when the latter has moved through the angle necessary to effect the closing of the circuit breaker and the operation of the connection changing switches to make possible the running of the motor, to move the sensitiveness reducing means into inoperative position.

2. In an electric motor starter in combination;—a wedge gear having an off position, a circuit breaker, an overload device adapted when operated by excess current to effect the opening of the circuit breaker; connection changing switches; means which when in operative position reduce the sensitiveness of the overload device; an operating shaft adapted to be rotated in the one direction only; means carried by the operating shaft adapted to operate the circuit breaker; means carried by the shaft adapted to operate the connection changing switches; means carried by the shaft adapted to operate the sensitiveness reducing device; said several means being so arranged in angular relationship that in successive angular positions the shaft first closes the circuit breaker, then operates the connection changing switches in succession, then moves the sensitiveness reducing device into inoperative position, and then moves the switch gear to the "off" position and moves the said device into operative position.

3. In an electric motor starter, in combination;—a motor, a circuit breaker; means tending to open the circuit breaker; detent means adapted to hold the circuit breaker closed; connection-changing switches; an operating shaft; means operated by the rotation of said shaft and adapted to close the circuit breaker; means operated by the said shaft and adapted to operate the connection-changing switches in succession; an overload device adapted when operated by excess current to release the circuit breaker detent; a sensitiveness reducing device adapted to be moved between operative and inoperative positions, and which in its operative position reduces the sensitiveness of the overload device; means connected to the operating shaft and adapted, after the latter shaft reaches the angular position in which it has closed the circuit breaker and operated the connection-changing switches so as to make possible the running of the motor, to move the sensitiveness reducing device into its inoperative position.

4. In an electric motor starter, in combination;—a motor, a circuit breaker, means tending to open the circuit breaker; detent means adapted to hold the circuit breaker closed; connection changing switches; an operating shaft; means operated by the said shaft and adapted to close the circuit breaker; means operated by the rotation of the said shaft and adapted to operate the connection-changing switches in succession; an overload device adapted when operated by excess current to release the circuit breaker detent; a sensitiveness reducing device adapted to be moved between operative and inoperative positions and adapted when in its operative position to reduce the sensitiveness of the overload device; means adapted to move the sensitiveness reducing device into its operative position; means connected to the operating shaft and adapted, after the latter shaft reaches the position in which it has closed the circuit breaker and operated the connection-changing switches so as to make possible the running of the motor, to move the sensitiveness reducing device into its inoperative position, releasing means adapted, except when held in inoperative position to release the circuit breaker detent independently of the overload device; a handle capable of movement about a main axis to actuate the operating shaft, and also capable of secondary movement about a secondary axis; means actuated by the secondary movement of the handle and adapted to render the releasing means inoperative; and means connected to the operating shaft and adapted, after the latter has been moved into the position in which it has moved the sensitiveness reducing device into its inoperative position, to render the releasing means inoperative.

5. In an electric motor starter, in combination;—a circuit breaker; means tending to open the circuit breaker; detent means adapted to hold the circuit breaker closed; connection-changing switches; an operating shaft; means operated by the said shaft and adapted to close the circuit breaker; means operated by the said shaft adapted to operate the connection-changing switches in succession; an overload device adapted when operated to release the circuit breaker detent; a spring operated trigger lever adapted when free to release the circuit breaker detent; an operating handle capable of movement about a main axis to actuate the operating shaft and also capable of movement about a secondary axis; means tending to move the handle about the secondary axis from its operative to an inoperative position; a trigger locking-piece moved by the handle as the latter moves from its inoperative to its operative position and adapted when so moved to render the spring operated trigger lever inoperative; gearing connecting the handle to the operating shaft and adapted, when the handle is oscillated in its operative position about its main axis, to impart a step-by-step angular movement to the operating shaft; a sensitiveness reducing device adapted in its operative position to reduce the sensitiveness of the overload device; means actuated by the operating shaft, adapted to move the sensitiveness reducing device into its inoperative position; a second trigger locking-piece carried by a part geared to the operating shaft and adapted when the latter shaft has reached the position in which it has moved the sensitiveness reducing device into its inoperative position, to render the spring operated trigger inoperative to release the circuit breaker detent.

6. In an electric motor starter in combination;—a circuit breaker; an overload device adapted when operated by excess current to effect the opening of the circuit breaker; connection-changing switches; a shaft adapted when rotary movement is imparted to it to close the circuit breaker and to operate the connection changing switches; means fitted to the overload device and adapted when in operative position to reduce the sensitiveness of the overload device; and means actuated by the operating shaft and adapted when the latter, after it has effected the running connections of the motor, has been moved further through a substantial angle, to render the sensitiveness reducing means inoperative.

7. In an electric motor starter in combination;—a circuit breaker; a series of overload devices each adapted when operated by excess current to effect the opening of the circuit breaker; connection changing switches; a shaft adapted when rotary movement is imparted to it to close the circuit breaker and to operate the connection changing switches in succession; means fitted to each overload device and adapted when in operative position to reduce the sensitiveness of the overload device; and means actuated by the operating shaft and adapted, when the latter has moved through the angle necessary to effect the closing of the circuit breaker and the operation of the connection changing switches, simultaneously to move the several sensitiveness reducing means into their inoperative positions.

8. In an electric motor starter in combination;—a circuit breaker; an electro-magnetic overload device having an armature and an actuating mechanism, and adapted when operated by excess current to effect the opening of the circuit breaker; connection changing switches; a shaft adapted when rotary movement is imparted to it to close the circuit breaker and to operate the connection changing switches in succession; movable means carrying the armature of the overload device; means carried by the operating shaft and adapted when the latter has moved through the angle necessary to effect the closing of the circuit breaker and the operation of the connection changing switches to make possible the running of the motor, to operate the said movable means and move the said armature from a weak to a strong part of the field of its actuating magnet.

9. In an electric motor starter in combination;—a circuit breaker; a series of electro-magnetic overload devices adapted respectively when operated by excess current to effect the opening of the circuit breaker; connection changing switches; an operating shaft adapted when rotary movement is imparted to it to close the circuit breaker and to operate the connection changing switches in succession; a movable support adapted to carry the armatures of the several overload devices; and means actuated by the operating shaft and adapted to impart movement to the said support.

10. In an electric motor starter in combination;—a circuit breaker; a series of electro-magnetic overload devices having armatures, and adapted when operated by excess current to effect the opening of the circuit breaker; connection-changing switches; a shaft adapted when rotary movement is imparted to it to close the circuit breaker and to operate the connection changing switches in succession; a movable platform adapted to carry the armatures of the overload devices; a weigh-shaft; levers fitted to the weigh-shaft; adjustable rods connecting the said levers to the platform; a lever on the said weigh-shaft; a cam on the operating shaft adapted when angular movement is imparted to the shaft to impart movement to the platform and move the armatures into a weaker part of the field of their magnets.

11. In an electric motor starter, in combination; a circuit breaker; a series of electromagnetic overload devices adapted when operated by excess current to effect the opening of the circuit breaker; connection changing switches; a shaft adapted when rotary movement is imparted to it to close the circuit breaker and to operate the connection changing switches in succession; a weigh shaft; levers on the weigh shaft; adjustable rods connecting the levers to the platform; adjustable means on the platform for varying the position of the respective armatures relatively to the platform; adjustable means for determining the limits of movement of the platform; a lever on the weigh shaft connected elastically to a cam lever; and a cam on the operating shaft adapted to operate the said lever.

12. In an electric motor starter, in combination; a circuit breaker; a series of electro-magnetic overload devices; a no-volt device having an armature; connection changing switches; an operating shaft; sensitiveness reducing devices connected to each of the overload devices; means actuated by the operating shaft to operate the sensitiveness reducing device; a trip shaft; levers on the trip shaft adapted to be operated by the respective overload armatures; a lever on the trip shaft adapted to be operated by the armature of the no-volt device; a detent adapted to hold the circuit breaker closed against a spring; a lever connected to the detent; a lever on the trip shaft adapted when the shaft is tripped to release the detent.

13. In an electric motor starter, in combination; a circuit breaker; a series of electromagnetic overload devices having armatures; a no-volt device having an armature; connection changing switches; an operating shaft; sensitiveness reducing devices connected to each of the overload devices; means actuated by the operating shaft to operate the sensitiveness reducing device; a trip shaft; levers on the trip shaft adapted to be operated by the respective overload armatures; a lever on the trip shaft adapted to be operated by the armature of the no-volt device; a detent shaft; a detent carried by said shaft; a lever carried by said shaft connected to a lever on the trip shaft so as to release the detent when the trip shaft is operated; a lever on the detent shaft; a spring controlled trigger lever adapted normally to operate the last mentioned lever and trip the detent; a locking piece carried by a rotating part geared to the operating shaft, to render the said trigger lever inoperative.

14. In an electric motor starter, in combination; a circuit breaker; a series of electromagnetic overload devices having armatures; a no-volt device having an armature; connection changing switches; an operating shaft; sensitiveness reducing devices connected to each of the overload devices; means actuated by the operating shaft to operate the sensitiveness reducing device; a trip shaft; means on the trip shaft adapted to be operated by the respective overload armatures; a lever on the trip shaft adapted to be operated by the armature of the no-volt device; a detent shaft; a detent carried by said shaft; a lever carried by said shaft connected to a lever on the trip shaft so as to release the detent when the trip shaft is operated; a lever on the detent shaft; a spring controlled trigger lever adapted normally to operate the last mentioned lever and trip the detent; a locking piece carried by a rotating part geared to the operating shaft and adapted when the operating shaft has been moved to the position in which it has effected the running connections of the motor, to render the said trigger lever inoperative; a handle geared to the operating shaft and adapted when oscillated about its main axis to impart a step by step rotation to the operating shaft; said handle being also capable of movement about a secondary axis into an inoperative position; a second locking piece operated by the handle when the latter is moved from its inoperative to its operative position and adapted when so operated to engage with the trigger lever and render the latter inoperative.

15. In an electric motor starter, in combination, a circuit breaker having fixed and movable contacts; a cam lever to which the movable contacts are connected; a spring tending to move the movable contacts to the "off" position; a detent adapted to hold said contacts in the closed position; connection changing switches having fixed and movable contacts; respective cam levers to which the said movable contacts are connected; an operating shaft; a cam on the operating shaft adapted by engagement with the cam lever to close the circuit breaker, cams on the operating shaft adapted by contact with the respective cam levers of the connection changing switches to successively close and hold closed the said switches in succession; overload devices adapted when actuated to cause the release of the circuit breaker detent; sensitiveness reducing devices for the circuit breaker; and a cam on the operating shaft adapted to operate the said devices.

In witness whereof I set my hand in presence of two witnesses.

JOHN ARTHUR HIRST.

Witnesses:
H. SHIELLING,
A. D. MURRAY.